United States Patent
Chen et al.

(10) Patent No.: US 12,284,661 B2
(45) Date of Patent: *Apr. 22, 2025

(54) METHOD AND APPARATUS USED IN WLAN NETWORKS

(71) Applicant: Intel Corporation, Santa Clara, CA (US)

(72) Inventors: Xiaogang Chen, Portland, OR (US); Thomas Kenney, Portland, OR (US); Qinghua Li, San Ramon, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,988

(22) Filed: Sep. 28, 2023

(65) Prior Publication Data

US 2024/0023141 A1   Jan. 18, 2024

Related U.S. Application Data

(63) Continuation of application No. 16/953,416, filed on Nov. 20, 2020, now Pat. No. 11,812,445.

(51) Int. Cl.
*H04W 72/04* (2023.01)
*H04W 72/27* (2023.01)
*H04W 72/30* (2023.01)
*H04W 72/53* (2023.01)
*H04W 84/12* (2009.01)

(52) U.S. Cl.
CPC ........... *H04W 72/30* (2023.01); *H04W 72/27* (2023.01); *H04W 72/53* (2023.01); *H04W 84/12* (2013.01)

(58) Field of Classification Search
None
See application file for complete search history.

(56) References Cited

U.S. PATENT DOCUMENTS

| 11,812,445 B2 * | 11/2023 | Chen | H04W 72/27 |
| 2021/0266121 A1 * | 8/2021 | Chen | H04W 72/0453 |
| 2022/0060941 A1 * | 2/2022 | Suh | H04W 28/065 |

* cited by examiner

*Primary Examiner* — Willie J Daniel, Jr.
(74) *Attorney, Agent, or Firm* — East IP P.C.

(57) ABSTRACT

The application provides a method, including: generating a Physical Layer (PHY) Protocol Data Unit (PPDU) comprising both information for one or more first-generation stations (R1 STAs) and information for one or more second-generation stations (R2 STAs); and transmitting the PPDU to the one or more R1 STAs and the one or more R2 STAs, wherein a preamble portion of the PPDU comprises Resource Unit (RU) allocation entries corresponding to the one or more R1 STAs and RU allocation entries corresponding to the one or more R2 STAs.

20 Claims, 11 Drawing Sheets

FIG. 3

| | \multicolumn{4}{c}{RU allocation subfields} | \multicolumn{3}{c}{User Specific Fields} |
|---|---|---|---|---|---|---|---|
| | CC1 | R2RU_1User_Start | RU_484 | R2RU_0User_Start | RU_242 | UserField_STA1_R2 | UserField_STA2_R1 | UserField_STA3_R1 |
| | CC2 | R2RU_0User_Start | RU_484_0User | R2RU_0User_end | RU_242 | UserField_STA1_R1 | UserField_STA4_R1 | |
| 484x2_STA1_R2 | | | | | | | | |
| 484x2_STA2_R1 | | | | | | | | |
| 484x2_STA1_R2 | | | | | | | | |
| 242_STA3_R1 | | | | | | | | |
| 242_STA4_R1 | | | | | | | | |

| | | RU allocation subfields | | | | | User Specific Fields | | | | |
|---|---|---|---|---|---|---|---|---|---|---|---|
| | | R2RU_2User_Start | R2RU_3User_Start | RU_484 | R2RU_0User_Start | RU_242 | UserField_STA1_R2 | UserField_STA2_R2 | UserField_STA2_R2 | UserField_STA7_R1 | |
| 484x2_STA1,2,3,4,5_R2 | CC1 | | | | | | | | | | |
| | CC2 | | | RU_484_0User | R2RU_0User_end | RU_242 | UserField_STA3_R2 | UserField_STA4_R2 | UserField_STA5_R2 | UserField_STA8_R1 | |
| 484x2_STA6_R1 | | | | | | | | | | | |
| 484x2_STA1,2,3,4,5_R2 | | | | | | | | | | | |
| 242_STA7_R1 | | | | | | | | | | | |
| 242_STA8_R1 | | | | | | | | | | | |

FIG. 4

EHT PPDU Format

EHT PPDU fields

| Field | Description |
|---|---|
| L-STF | Non-HT Short Training field |
| L-LTF | Non-HT Long Training field |
| L-SIG | Non-HT SIGNAL field |
| RL-SIG | Repeated Non-HT SIGNAL field |
| U-SIG | Universal SIGNAL field |
| EHT-SIG | EHT SIGNAL field |
| EHT-STF | EHT Short Training field |
| EHT-LTF | EHT Long Training field |
| Data | The Data field carrying the PSDU(s) |
| PE | Packet extension field |

METHOD AND APPARATUS USED IN WLAN NETWORKS

CROSS REFERENCE TO RELATED APPLICATIONS

This application is a continuation application of U.S. patent application Ser. No. 16/953,416 filed on Nov. 20, 2020. The aforementioned patent application is hereby incorporated by reference in its entirety.

TECHNICAL FIELD

Embodiments of the present disclosure generally relate to wireless communications in a wireless local area network (WLAN), and in particular, to a method and apparatus used in a WLAN.

BACKGROUND

An Extremely High Throughput (EHT) network, also known as 802.11be network, achieves high throughput through a series of system features and various mechanisms. In Down Link (DL) Orthogonal Frequency Division Multiple Access (OFDMA), the EHT network may reuse 802.11ax Resource Unit (RU) allocation table for resource allocation. The 802.11ax RU allocation table is a 9-bit table which has 512 RU allocation entries in total, wherein about 270 RU allocation entries are used for indicating MRUs defined for first-generation stations (R1 STAs) in the 802.11be network and the remaining RU allocation entries are reserved.

With development of the EHT network, when second-generation STAs (R2 STAs) are developed and deployed within the EHT network, as the 802.11ax RU allocation table does not include any RU allocation entry for indicating any RU defined for the R2 STAs, the R1 STAs cannot, based on the 802.11ax RU allocation table, correctly decode user fields for the R1 STAs in an EHT Physical Layer (PHY) Protocol Data Unit (EHT PPDU), which includes both information for the R1 STAs and information for the R2 STAs.

SUMMARY

An aspect of the disclosure provides a method, comprising: generating a Physical Layer (PHY) Protocol Data Unit (PPDU) comprising both information for one or more first-generation stations (R1 STAs) and information for one or more second-generation stations (R2 STAs); and transmitting the PPDU to the one or more R1 STAs and the one or more R2 STAs, wherein a preamble portion of the PPDU comprises Resource Unit (RU) allocation entries corresponding to the one or more R1 STAs and RU allocation entries corresponding to the one or more R2 STAs.

An aspect of the disclosure provides an apparatus, comprising processor circuitry configured to: generate a Physical Layer (PHY) Protocol Data Unit (PPDU) comprising both information for one or more first-generation stations (R1 STAs) and information for one or more second-generation stations (R2 STAs); and transmit the PPDU to the one or more R1 STAs and the one or more R2 STAs, wherein a preamble portion of the PPDU comprises Resource Unit (RU) allocation entries corresponding to the one or more R1 STAs and RU allocation entries corresponding to the one or more R2 STAs.

BRIEF DESCRIPTION OF THE DRAWINGS

Embodiments of the disclosure will be illustrated, by way of example and not limitation, in conjunction with the figures of the accompanying drawings in which like reference numerals refer to similar elements and wherein:

FIG. 3 is a table for explanation of solution 2 to indicate RUs defined for R2 STAs.

FIG. 4 is another table for explanation of solution 2 to indicate RUs defined for R2 STAs.

DETAILED DESCRIPTION

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

Figure 1:
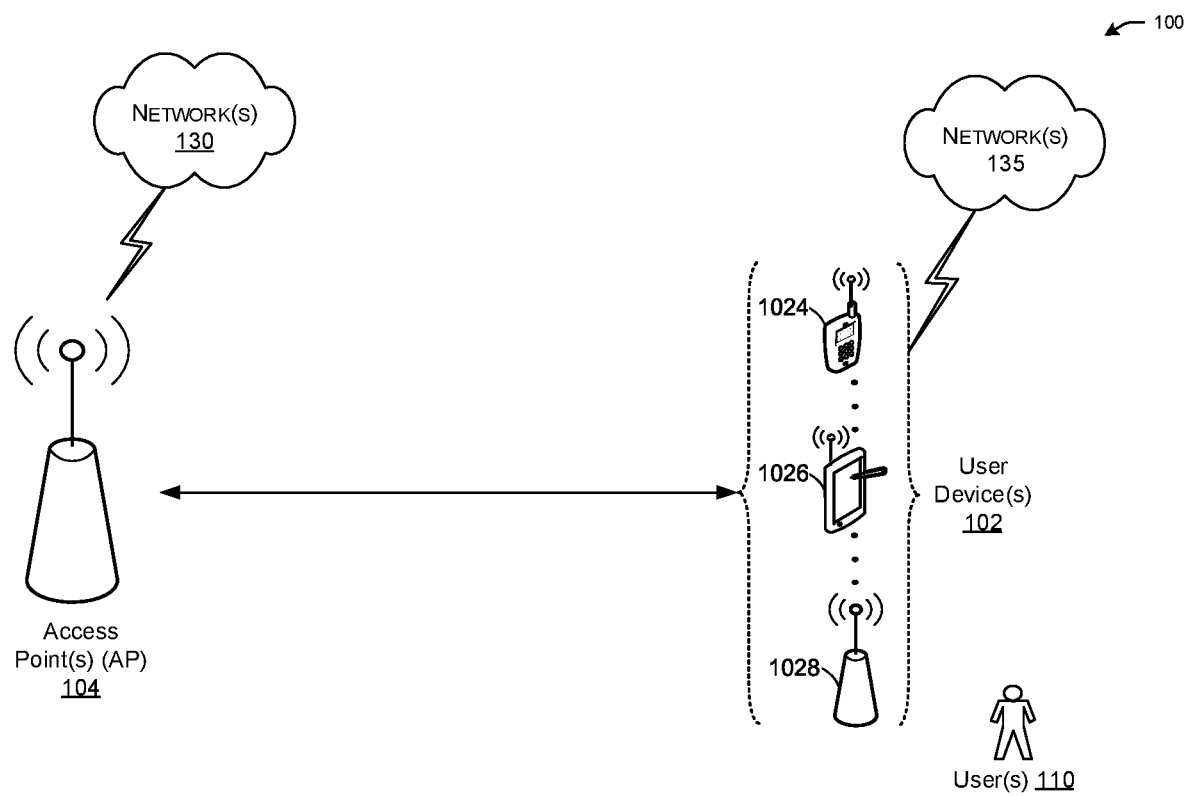
FIG. 1 is a network diagram illustrating an example network environment according to some example embodiments of the disclosure.

FIG. 1 is a network diagram illustrating an example network environment according to some example embodiments of the disclosure. As shown in FIG. 1, a wireless network 100 may include one or more user devices 102 and one or more access points (APs) 104, which may communicate in accordance with IEEE 802.11 communication standards. The user devices 102 may be mobile devices that are non-stationary (e.g., not having fixed locations) or may be stationary devices.

Figure 7:
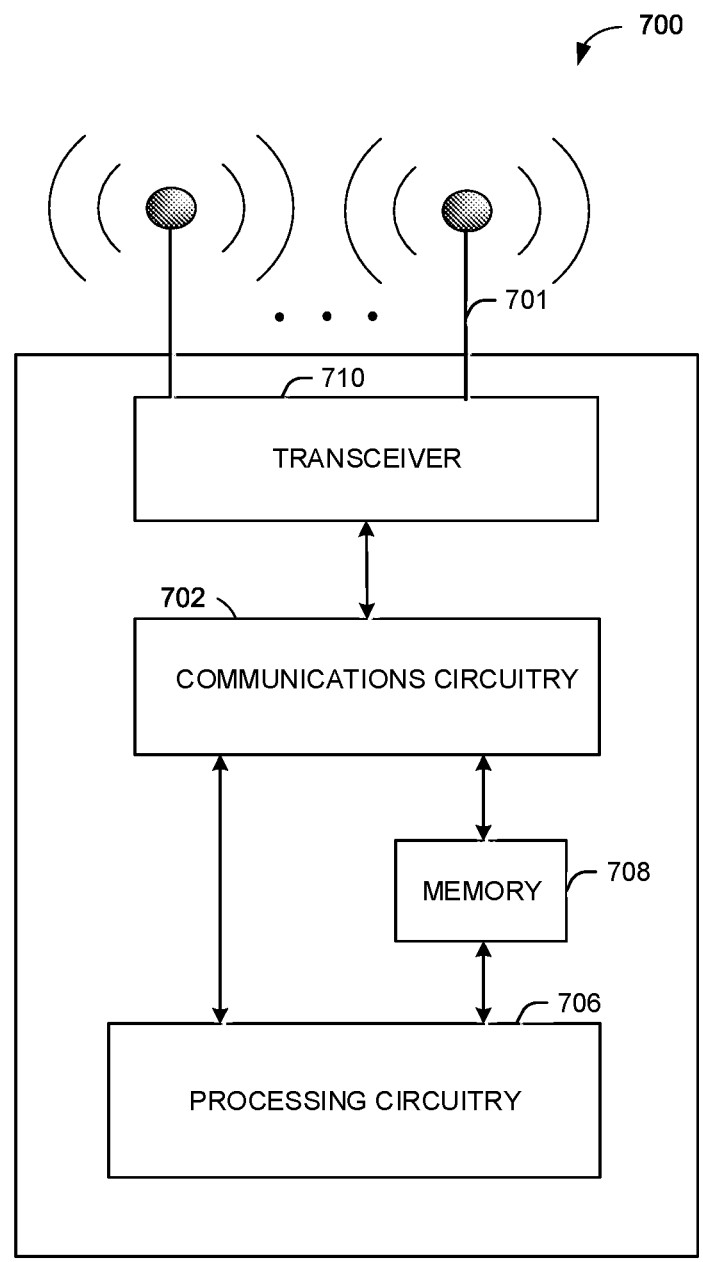
FIG. 7 is a functional diagram of an exemplary communication station 700, in accordance with one or more example embodiments of the disclosure.
Figure 8:
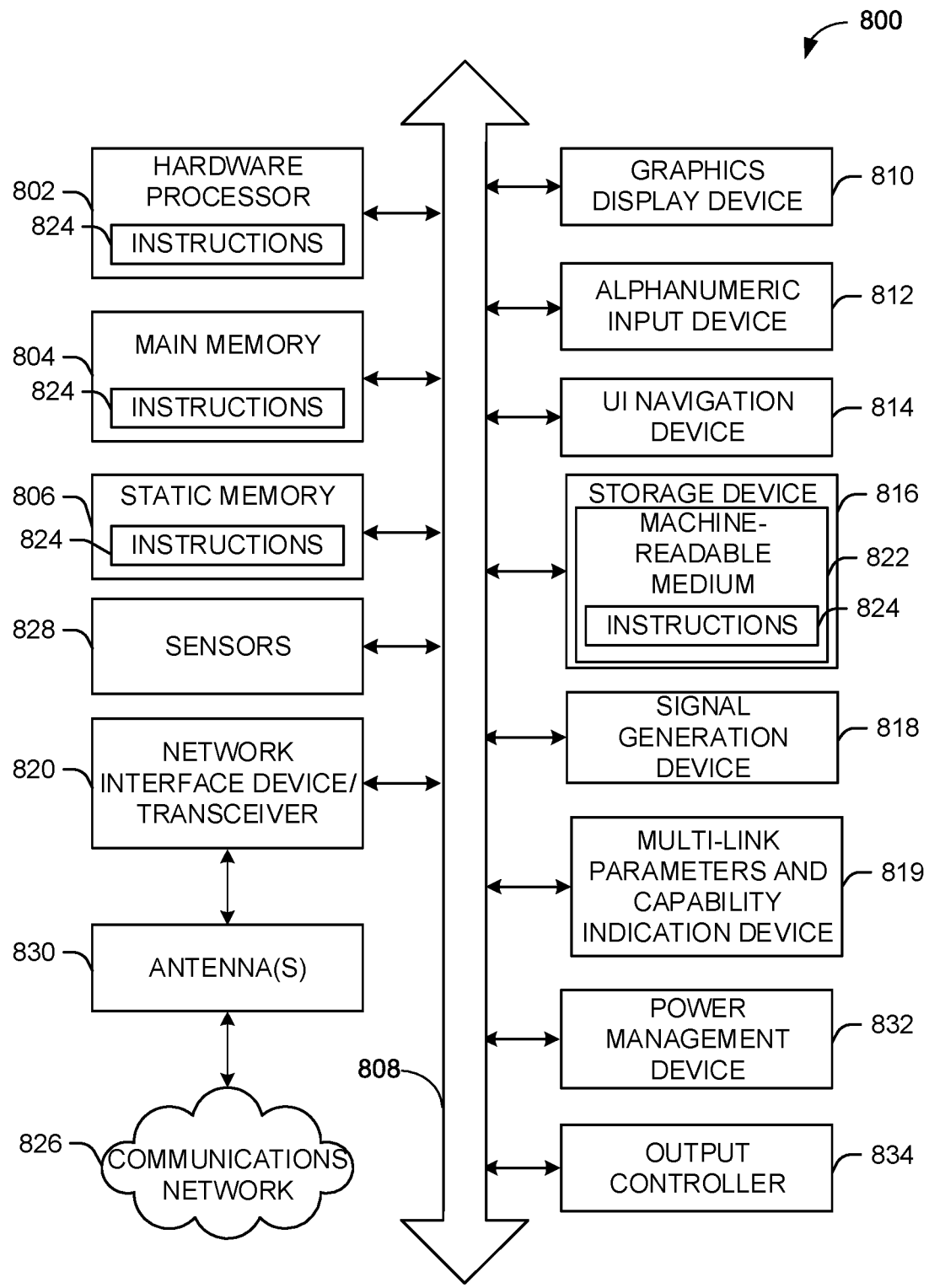
FIG. 8 is a block diagram of an example of a machine or system 800 upon which any one or more of the techniques (e.g., methodologies) discussed herein may be performed.

In some embodiments, the user devices 102 and APs 104 may include one or more function modules similar to those in the functional diagram of FIG. 7 and/or the example machine/system of FIG. 8.

The one or more user devices 102 and/or APs 104 may be operable by one or more users 110. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more user devices 102 and the one or more APs 104 may be STAs. The one or more user devices 102 and/or APs 104 may operate as a personal basic service set (PBSS) control point/access point (PCP/AP). The user devices 102 (e.g., 1024, 1026, or 1028) and/or APs 104 may include any suitable processor-driven device including, but not limited to, a mobile device or a non-mobile, e.g., a static device. For example, the user devices 102 and/or APs 104 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a personal digital assistant (PDA) device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a personal communications service (PCS) device, a PDA device which incorporates a wireless communication device, a mobile or portable global positioning system (GPS) device, a digital video broadcasting (DVB) device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user devices 102 and/or APs 104 may also include mesh stations in, for example, a mesh network, in accordance with one or more IEEE 802.11 standards and/or 3GPP standards.

Any of the user devices 102 (e.g., user devices 1024, 1026, 1028) and APs 104 may be configured to communicate with each other via one or more communications networks 130 and/or 135 wirelessly or wired. The user devices 102 may also communicate peer-to-peer or directly with each other with or without APs 104. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 102 (e.g., user devices 1024, 1026, 1028) and APs 104 may include one or more communications antennas. The one or more communications antennas may be any suitable type of antennas corresponding to the communications protocols used by the user devices 102 (e.g., user devices 1024, 1026 and 1028) and APs 104. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 102 and/or APs 104.

Any of the user devices 102 (e.g., user devices 1024, 1026, 1028) and APs 104 may be configured to perform directional transmission and/or directional reception in conjunction with wirelessly communicating in a wireless network. Any of the user devices 102 (e.g., user devices 1024, 1026, 1028) and APs 104 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user devices 102 (e.g., user devices 1024, 1026, 1028) and APs 104 may be configured to perform any given directional transmission towards one or more defined transmit sectors. Any of the user devices 102 (e.g., user devices 1024, 1026, 1028) and APs 104 may be configured to perform any given directional reception from one or more defined receive sectors.

MIMO beamforming in a wireless network may be accomplished using radio frequency (RF) beamforming and/or digital beamforming. In some embodiments, in performing a given MIMO transmission, the user devices 102 and/or APs 104 may be configured to use all or a subset of its one or more communications antennas to perform MIMO beamforming.

Any of the user devices 102 (e.g., user devices 1024, 1026, 1028) and APs 104 may include any suitable radio and/or transceiver for transmitting and/or receiving radio frequency (RF) signals in the bandwidth and/or channels corresponding to the communications protocols utilized by any of the user devices 102 and APs 104 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In some embodiments, it is proposed to provide 802.11be RU allocation table for resource allocation. The 802.11be RU allocation table may include both RU allocation entries for indicating RUs defined for R1 STAs and RU allocation entries for indicating RUs defined for R2 STAs. The RU allocation entries for indicating the RUs defined for the R1 STAs may be different from the RU allocation entries for indicating the RUs defined for the R1 STAs. That is to say, the RU allocation entries for indicating the RUs defined for the R1 STAs may be a part of the RU allocation entries in the 802.11be RU allocation table, and the RU allocation entries for indicating the RUs defined for the R2 STAs may be a different part of the RU allocation entries in the 802.11be RU allocation table.

In some embodiments, similar as 802.11ax RU allocation table, the 802.11be RU allocation table is a 9-bit table which includes 512 RU allocation entries in total, wherein there are about 270 RU allocation entries for indicating the RUs defined for the R1 STAs and a part of or all of the remaining RU allocation entries may be used for indicating the RUs defined for the R2 STAs. The RU allocation entries for indicating the RUs defined for the R1 STAs may be the same as those in the 802.11ax RU allocation table that is previously reused by the 802.11be network.

Figure 2:
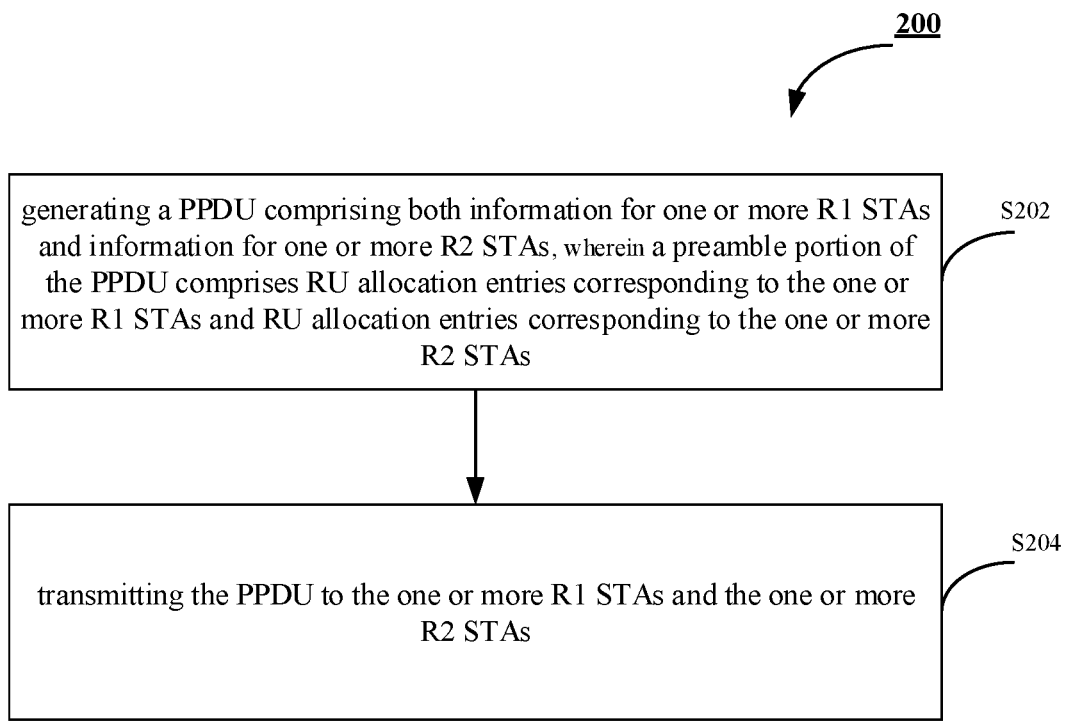
FIG. 2 is a flowchart showing a method 200 according to some example embodiments of the disclosure.

In some embodiments, with reference to FIG. 1, the user devices 102 may include one or more R1 STAs and one or more R2 STAs, both of which may communicate with any of APs 104 according to 802.11 standards including 802.11be. FIG. 2 is flowchart showing a method 200 according to some example embodiments of the disclosure. As shown in FIG. 2, the method 200 includes: S202, generating a PPDU comprising both information for the one or more R1 STAs and information for the one or more R2 STAs, wherein a preamble portion of the PPDU comprises RU allocation entries corresponding to the one or more R1 STAs and RU allocation entries corresponding to the one or more R2 STAs; S204, transmitting the PPDU to the one or more R1 STAs and the one or more R2 STAs. It should be appreciated that the method 200 may be implemented by any of APs 104 to transmit information to the R1 STAs and the R2 STAs, simultaneously.

In some embodiments, the RU allocation entries corresponding to the one or more R1 STAs are selected from the RU allocation entries for indicating the RUs defined for the R1 STAs, and the RU allocation entries corresponding to the one or more R2 STAs are selected from the RU allocation entries for indicating the RUs defined for R2 STAs.

In some embodiments, the RU allocation entries corresponding to the one or more R1 STAs and the RU allocation entries corresponding to the one or more R2 STAs may be comprised in RU allocation subfields of the preamble portion.

In some embodiment, based on the 802.11be RU allocation table, upon receiving the PPDU including both the information for the one or more R1 STAs and information for the one or more R2 STAs, any of the one or more R1 STAs can correctly understand the number of user fields and the structure of the user fields in the PDU and thus correctly decode the user fields for the R1 STA.

In some embodiments, there are two solutions to indicate the RUs defined for the R2 STAs.

Solution 1

In some embodiments, about 220 RU allocation entries in the 802.11be RU allocation table are not used for indicating the RUs defined for the R1 STAs, and may be used for indicating the RUs defined for the R2 STAs.

In some embodiments, eight RU allocation entries may be allocated for indicating 1 to 8 users allocated to each RU defined for the R2 STAs, and the RU allocation entries for indicating the RUs defined for R2 STAs in the 802.11be RU allocation table may be used to indicate at least 27 RUs defined for the R2 STAs, wherein floor(220/8)=27. For example, RU allocation entries 300~307 may be allocated for indicating RU y, RU allocation entries 308~315 may allocated for indicating RU z, and so on.

In some embodiments, an index value of a RU allocation entry for indicating 1 to 8 users allocated to a RU defined for the R2 STAs may be used to indicate the number of user fields, which are contributed to user specific fields in the same content channel as RU allocation subfields including the RU allocation entry in the preamble portion. For example, the number of user fields contributed to the user specific fields is derived based on the following expression:

$$N\_user = mod(n\_index, 8) + 1$$

wherein N_user denotes the number of user fields contributed to the user specific fields and n_index denotes the index value of the RU allocation entry. For example, the index value 300~307 of RU allocation entry 300~307 may be used to indicate 1-8 user fields, which are contributed to the user specific fields in the same content channel as the RU allocation subfields including the RU allocation entry 300~307; the index value 308~315 of RU allocation entry 308~315 may be used to indicate 1-8 user fields, which are contributed to the user specific fields in the same content channel as the RU allocation subfields including the RU allocation entry 308~315.

In some embodiment, a RU allocation entry for indicating a RU assigned to any of the one or more R2 STAs may be selected from the eight RU allocation entries for indicating the RU. For example, the RU allocation entry for indicating the RU assigned to the R2 STA is selected according to the number of STAs within the R2 STA. In this case, the RU allocation entry for indicating the RU assigned to the R2 STA contributes a number of user fields to the user specific fields in the same content channel as the RU allocation subfields including the RU allocation entry in the preamble portion and the number of user fields is equal to the number of STAs within the R2 STA.

In some embodiments, both the RUs defined for the R1 STAs and the RUs defined for the R2 STAS may be multi-RUs (MRUs), and the structure of the MRUs defined for the R2 STAs may be the same as that of the MRUs defined for the R1 STAs.

In this solution, the R1 STAs need to parse the entry index of the RU allocation entry to figure out the number of user fields in the user specific field to derive the correct structure for the user fields for the R1 STAs. The R2 STAs can parse the RUs defined for the R2 STAs by a similar way as the R1 STAs.

Solution 2

In some embodiments, ten of the RU allocation entries that are not used for indicating the RUs defined for the R1 STAs in the 802.11be RU allocation table may be used for indicating the RUs defined for the R2 STAs.

In some embodiments, the ten RU allocation entries for indicating the RUs defined for the R2 STAs may include R2RU_0User_Start, R2RU_1User_Start, R2RU_3User_Start, R2RU_4User_Start, R2RU_5User_Start, R2RU_6User_Start, R2RU_7User_Start, R8RU_1User_Start, R2RU_9User_Start, and R2RU_0User_end, wherein:

the R2RU_0User_Start is used to indicate a RU allocation subfield comprising the R2RU_0User_Start is a continuation of the previous RU rather than a new RU;

the R2RU_1User_Start is used to indicate the start of a RU defined for the R2 STAs;

the R2RU_XUser_Start is used to indicate the start of a RU defined for a R2 STA comprising X STAs, wherein X is an integer larger than 1 and less than or equal to 8;

the R2RU_0User_end is used to indicate the end of a RU corresponding to R2RU_0User_Start, R2RU_1User_Start, or R2RU_XUser_Start, which is closest to the R2RU_0User_end.

In some embodiment, the RU allocation entry for indicating the RU assigned to the R2 STA is selected according to the number of STAs within the R2 STA. In this case, the RU allocation entry for indicating the RU assigned to the R2 STA contributes a number of user fields to the user specific fields in the same content channel as the RU allocation subfields including the RU allocation entry in the preamble portion and the number of user fields is equal to the number of STAs within the R2 STA.

In some embodiments, both the RUs defined for the R1 STAs and the RUs defined for the R2 STAS may be multi-RUs (MRUs), and the structure of the MRUs defined for the R2 STAs may be the same as that of the MRUs defined for the R1 STAs.

FIG. 3 is a table for explanation of solution 1 to indicate MRUs defined for R2 STAs. The table shown in FIG. 3 is an example of 160 MHz PPDU including one R2 STA with 484×2 tone MRU and the other STAs are R1 STAs.

As shown in FIG. 3, the R2RU_1User_Start is used to indicate the start of a MRU assigned to one R2 STA; the R2RU_0User_Start is used to indicate that the RU allocation subfield including the R2RU_0User_Start is a continuation of the previous MRU instead of a new MRU because it indicates a "0" user; the R2RU_0User_end is used to indicate the end of a MRU corresponding to the closest R2RU_0User_Start or R2RU_1User_Start.

FIG. 4 is another table for explanation of solution 1 to indicate RUs defined for R2 STAs. The table shown FIG. 4 is another example of solution 1 for the case that Multi-user Multiple-Input Multiple-Output (MU MIMO) is used. The only difference between the example shown in FIG. 4 and the example shown in FIG. 3 is that there is R2RU_2User_Start for indicating the MRU for STA1 and STA2 in the R2 STA including STA1 to STA 5 and R2RU_3User_Start for indicating the MRU for the STA 3-5 in the R2 STA.

With the method 200 including solution 2, the R1 STAs may understand the number of user fields in the user specific fields and the structure of the user specific fields, such that the R1 STAs will be able to decode the user fields for R1 correctly. The R2 STAs need to parse the RU allocation subfields to find out the start and end of each RU defined for the R2 STAs, and this is extra complexity the R2 STAs have to pay.

Figures 5, 6:
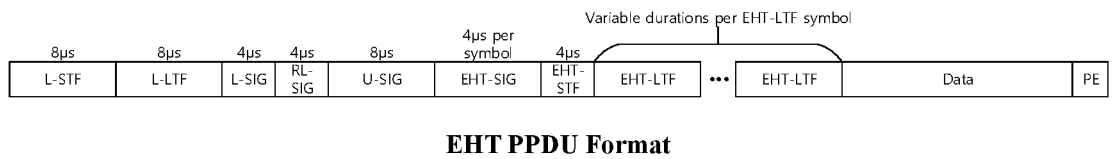
FIG. 5 is a structure diagram showing EHT PPDU Format.
FIG. 6 is a table showing a description of EHT PPDU fields.

In some embodiments, the PPDU is an EHT PPDU. FIG. 5 is a structure diagram showing EHT PPDU Format. FIG. 6 is a table showing a description of EHT PPDU fields. The format of the EHT PPDU is used for transmission to one or more users if the PPDU is not a response of a trigger frame. In the EHT PPDU, the EHT-SIG field is present. The EHT preamble consists of pre-EHT modulated fields and EHT modulated fields. The pre-EHT modulated fields for the EHT PPDU format are the following: L-STF, L-LTF, L-SIG, RL-SIG, U-SIG and EHT-SIG fields. The EHT modulated fields in the preamble for all the EHT PPDU format are the EHT-STF and EHT-LTF fields.

In some embodiments, the RU allocation entries corresponding to the one or more R1 STAs and the RU allocation entries corresponding to the one or more R2 STAs are contained in EHT-SIG of the preamble portion of the EHT PPDU, and the abovementioned content channel is EHT-SIG content channel. The method 200 may be applied in 802.11be Wireless Local Area Networks (WLANs).

FIG. 7 shows a functional diagram of an exemplary communication station 700, in accordance with one or more example embodiments of the disclosure. In one embodiment, FIG. 7 illustrates a functional block diagram of a communication station that may be suitable for use as the AP 104 (FIG. 1) or the user device 102 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for transmitting and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an liquid crystal display (LCD) screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device.

FIG. 8 illustrates a block diagram of an example of a machine ZZ00 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a multi-link parameters and capability indication device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the disclosure may be carried out by a baseband processor. The baseband processor may be configured to generate corresponding baseband signals. The baseband processor may further include physical layer (PHY) and medium access control layer (MAC) circuitry, and may further interface with the hardware processor 802 for generation and processing of the baseband signals and for controlling operations of the main memory 804, the storage device 816, and/or the multi-link parameters and capability indication device 819. The baseband processor may be provided on a single radio card, a single chip, or an integrated circuit (IC).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The multi-link parameters and capability indication device 819 may carry out or perform any of the operations and processes (e.g., process XY00) described and shown above.

It is understood that the above are only a subset of what the multi-link parameters and capability indication device 819 may be configured to perform and that other functions included throughout this disclosure may also be performed by the multi-link parameters and capability indication device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 9:
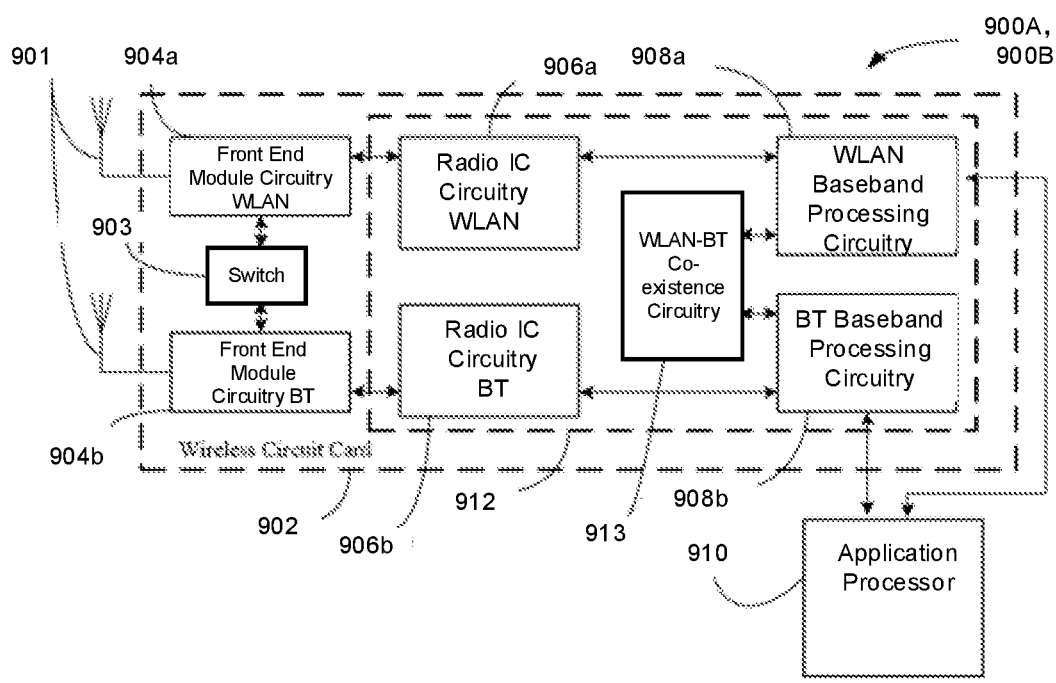
FIG. 9 is a block diagram of a radio architecture 900A, 900B in accordance with some embodiments that may be implemented in any one of APs 104 and/or the user devices 102 of FIG. 1.

FIG. 9 is a block diagram of a radio architecture 900A, 900B in accordance with some embodiments that may be implemented in any one of APs 104 and/or the user devices 102 of FIG. 1. Radio architecture 900A, 900B may include radio front-end module (FEM) circuitry 904a-b, radio IC circuitry 906a-b and baseband processing circuitry 908a-b. Radio architecture 900A, 900B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 904a-b may include a WLAN or Wi-Fi FEM circuitry 904a and a Bluetooth (BT) FEM circuitry 904b. The WLAN FEM circuitry 904a may include a receive signal path comprising circuitry configured to operate on WLAN RF signals received from one or more antennas 901, to amplify the received signals and to provide the amplified versions of the received signals to the WLAN radio IC circuitry 906a for further processing. The BT FEM circuitry 904b may include a receive signal path which may include circuitry configured to operate on BT RF signals received from one or more antennas 901, to amplify the received signals and to provide the amplified versions of the received signals to the BT radio IC circuitry 906b for further processing. FEM circuitry 904a may also include a transmit signal path which may include circuitry configured to amplify WLAN signals provided by the radio IC circuitry 906a for wireless transmission by one or more of the antennas 901. In addition, FEM circuitry 904b may also include a transmit signal path which may include circuitry configured to amplify BT signals provided by the radio IC circuitry 906b for wireless transmission by the one or more antennas. In the embodiment of FIG. 9, although FEM 904a and FEM 904b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 906a-b as shown may include WLAN radio IC circuitry 906a and BT radio IC circuitry 906b. The WLAN radio IC circuitry 906a may include a receive signal path which may include circuitry to down-convert WLAN RF signals received from the FEM circuitry 904a and provide baseband signals to WLAN baseband processing circuitry 908a. BT radio IC circuitry 906b may in turn include a receive signal path which may include circuitry to down-convert BT RF signals received from the FEM circuitry 904b and provide baseband signals to BT baseband processing circuitry 908b. WLAN radio IC circuitry 906a may also include a transmit signal path which may include circuitry to up-convert WLAN baseband signals provided by the WLAN baseband processing circuitry 908a and provide WLAN RF output signals to the FEM circuitry 904a for subsequent wireless transmission by the one or more antennas 901. BT radio IC circuitry 906b may also include a transmit signal path which may include circuitry to up-convert BT baseband signals provided by the BT baseband processing circuitry 908b and provide BT RF output signals to the FEM circuitry 904b for subsequent wireless transmission by the one or more antennas 901. In the embodiment of FIG. 9, although radio IC circuitries 906a and 906b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 908a-b may include a WLAN baseband processing circuitry 908a and a BT baseband processing circuitry 908b. The WLAN baseband processing circuitry 908a may include a memory, such as, for example, a set of RAM arrays in a Fast Fourier Transform or Inverse Fast Fourier Transform block (not shown) of the WLAN baseband processing circuitry 908a. Each of the WLAN baseband circuitry 908a and the BT baseband circuitry 908b may further include one or more processors and control logic to process the signals received from the corresponding WLAN or BT receive signal path of the radio IC circuitry 906a-b, and to also generate corresponding WLAN or BT baseband signals for the transmit signal path of the radio IC circuitry 906a-b. Each of the baseband processing circuitries 908a and 908b may further include physical layer (PHY) and medium access control layer (MAC) circuitry, and may further interface with a device for generation and processing of the baseband signals and for controlling operations of the radio IC circuitry 906a-b.

Referring still to FIG. 9, according to the shown embodiment, WLAN-BT coexistence circuitry 913 may include logic providing an interface between the WLAN baseband circuitry 908a and the BT baseband circuitry 908b to enable use cases requiring WLAN and BT coexistence. In addition, a switch 903 may be provided between the WLAN FEM circuitry 904a and the BT FEM circuitry 904b to allow switching between the WLAN and BT radios according to application needs. In addition, although the antennas 901 are depicted as being respectively connected to the WLAN FEM circuitry 904a and the BT FEM circuitry 904b, embodiments include within their scope the sharing of one or more antennas as between the WLAN and BT FEMs, or the provision of more than one antenna connected to each of FEM 904*a* or 904*b*.

In some embodiments, the front-end module circuitry 904*a-b*, the radio IC circuitry 906*a-b*, and baseband processing circuitry 908*a-b* may be provided on a single radio card, such as wireless radio card 9. In some other embodiments, the one or more antennas 901, the FEM circuitry 904*a-b* and the radio IC circuitry 906*a-b* may be provided on a single radio card. In some other embodiments, the radio IC circuitry 906*a-b* and the baseband processing circuitry 908*a-b* may be provided on a single chip or integrated circuit (IC), such as IC 912.

In some embodiments, the wireless radio card 902 may include a WLAN radio card and may be configured for Wi-Fi communications, although the scope of the embodiments is not limited in this respect. In some of these embodiments, the radio architecture 900A, 900B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 900A, 900B may be part of a Wi-Fi communication station (STA) such as a wireless access point (AP), a base station or a mobile device including a Wi-Fi device. In some of these embodiments, radio architecture 900A, 900B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 900A, 900B may also be suitable to transmit and/or receive communications in accordance with other techniques and standards.

In some embodiments, the radio architecture 900A, 900B may be configured for high-efficiency Wi-Fi (HEW) communications in accordance with the IEEE 802.11ax standard. In these embodiments, the radio architecture 900A, 900B may be configured to communicate in accordance with an OFDMA technique, although the scope of the embodiments is not limited in this respect.

In some other embodiments, the radio architecture 900A, 900B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 9, the BT baseband circuitry 908*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 900A, 900B may include other radio cards, such as a cellular radio card configured for cellular (e.g., 5GPP such as LTE, LTE-Advanced or 7G communications).

In some IEEE 802.11 embodiments, the radio architecture 900A, 900B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 10:
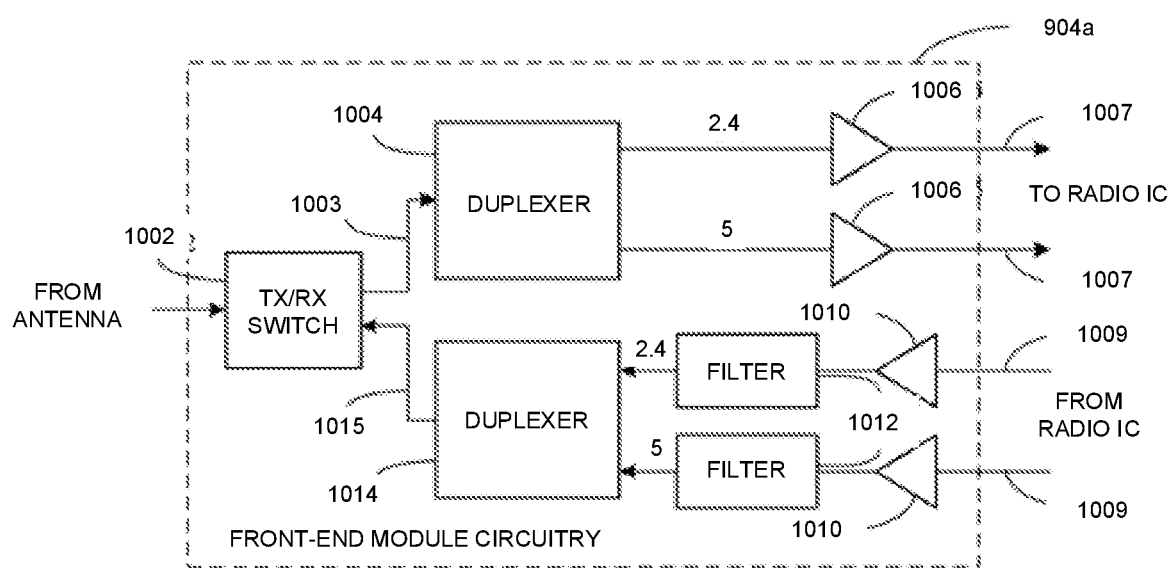
FIG. 10 illustrates WLAN FEM circuitry 904a in accordance with some embodiments.

FIG. 10 illustrates WLAN FEM circuitry 904*a* in accordance with some embodiments. Although the example of FIG. 10 is described in conjunction with the WLAN FEM circuitry 904*a*, the example of FIG. 10 may be described in conjunction with the example BT FEM circuitry 904*b* (FIG. 9), although other circuitry configurations may also be suitable.

In some embodiments, the FEM circuitry 904*a* may include a TX/RX switch 1002 to switch between transmit mode and receive mode operation. The FEM circuitry 904*a* may include a receive signal path and a transmit signal path. The receive signal path of the FEM circuitry 904*a* may include a low-noise amplifier (LNA) 1006 to amplify received RF signals 1003 and provide the amplified received RF signals 1007 as an output (e.g., to the radio IC circuitry 906*a-b* (FIG. 9)). The transmit signal path of the circuitry 904*a* may include a power amplifier (PA) to amplify input RF signals 1009 (e.g., provided by the radio IC circuitry 906*a-b*), and one or more filters 1012, such as band-pass filters (BPFs), low-pass filters (LPFs) or other types of filters, to generate RF signals 1015 for subsequent transmission (e.g., by one or more of the antennas 901 (FIG. 9)) via an example duplexer 1014.

In some dual-mode embodiments for Wi-Fi communication, the FEM circuitry 904*a* may be configured to operate in either the 2.4 GHz frequency spectrum or the 5 GHz frequency spectrum. In these embodiments, the receive signal path of the FEM circuitry 904*a* may include a receive signal path duplexer 1004 to separate the signals from each spectrum as well as provide a separate LNA 1006 for each spectrum as shown. In these embodiments, the transmit signal path of the FEM circuitry 904*a* may also include a power amplifier 1010 and a filter 1012, such as a BPF, an LPF or another type of filter for each frequency spectrum and a transmit signal path duplexer 1004 to provide the signals of one of the different spectrums onto a single transmit path for subsequent transmission by the one or more of the antennas 901 (FIG. 9). In some embodiments, BT communications may utilize the 2.4 GHz signal paths and may utilize the same FEM circuitry 904*a* as the one used for WLAN communications.

Figure 11:
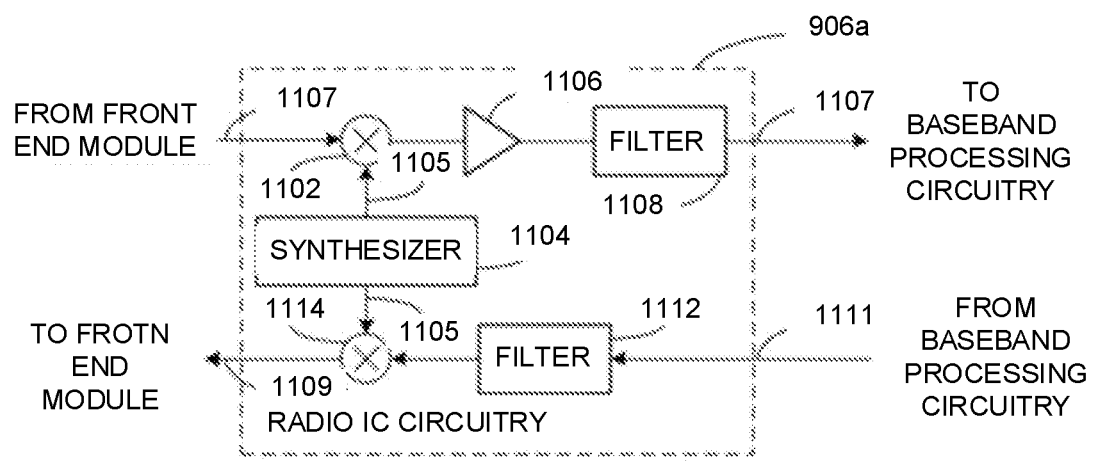
FIG. 11 illustrates radio IC circuitry 906a in accordance with some embodiments.

FIG. 11 illustrates radio IC circuitry 906*a* in accordance with some embodiments. The radio IC circuitry 906*a* is one example of circuitry that may be suitable for use as the WLAN or BT radio IC circuitry 906*a*/906*b* (FIG. 9), although other circuitry configurations may also be suitable. Alternatively, the example of FIG. 11 may be described in conjunction with the example BT radio IC circuitry 906*b*.

In some embodiments, the radio IC circuitry 906*a* may include a receive signal path and a transmit signal path. The receive signal path of the radio IC circuitry 906*a* may include at least mixer circuitry 1102, such as, for example, down-conversion mixer circuitry, amplifier circuitry 1106 and filter circuitry 1108. The transmit signal path of the radio IC circuitry 906*a* may include at least filter circuitry 1112 and mixer circuitry 1114, such as, for example, up-conversion mixer circuitry. Radio IC circuitry 906*a* may also include synthesizer circuitry 1104 for synthesizing a frequency 1105 for use by the mixer circuitry 1102 and the mixer circuitry 1114. The mixer circuitry 1102 and/or 1114 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 11 illustrates only a simplified version of a radio IC circuitry, and may include, although not shown, embodiments where each of the depicted circuitries may include more than one component. For instance, mixer circuitry 1114 may each include one or more mixers, and filter circuitries 1108 and/or 1112 may each include one or more filters, such as one or more BPFs and/or LPFs according to application needs. For example, when mixer circuitries are of the direct-conversion type, they may each include two or more mixers.

In some embodiments, mixer circuitry 1102 may be configured to down-convert RF signals 1007 received from the FEM circuitry 904*a*-*b* (FIG. 9) based on the synthesized frequency 1105 provided by synthesizer circuitry 1104. The amplifier circuitry 1106 may be configured to amplify the down-converted signals and the filter circuitry 1108 may include an LPF configured to remove unwanted signals from the down-converted signals to generate output baseband signals 1107. Output baseband signals 1107 may be provided to the baseband processing circuitry 908*a*-*b* (FIG. 9) for further processing. In some embodiments, the output baseband signals 1107 may be zero-frequency baseband signals, although this is not a requirement. In some embodiments, mixer circuitry 1102 may comprise passive mixers, although the scope of the embodiments is not limited in this respect.

In some embodiments, the mixer circuitry 1114 may be configured to up-convert input baseband signals 1111 based on the synthesized frequency 1105 provided by the synthesizer circuitry 1104 to generate RF output signals 1009 for the FEM circuitry 904*a*-*b*. The baseband signals 1111 may be provided by the baseband processing circuitry 908*a*-*b* and may be filtered by filter circuitry 1112. The filter circuitry 1112 may include an LPF or a BPF, although the scope of the embodiments is not limited in this respect.

In some embodiments, the mixer circuitry 1102 and the mixer circuitry 1114 may each include two or more mixers and may be arranged for quadrature down-conversion and/or up-conversion respectively with the help of synthesizer 1104. In some embodiments, the mixer circuitry 1102 and the mixer circuitry 1114 may each include two or more mixers each configured for image rejection (e.g., Hartley image rejection). In some embodiments, the mixer circuitry 1102 and the mixer circuitry 1114 may be arranged for direct down-conversion and/or direct up-conversion, respectively. In some embodiments, the mixer circuitry 1102 and the mixer circuitry 1114 may be configured for super-heterodyne operation, although this is not a requirement.

Mixer circuitry 1102 may comprise, according to one embodiment: quadrature passive mixers (e.g., for the in-phase (I) and quadrature phase (Q) paths). In such an embodiment, RF input signal 1007 from FIG. 11 may be down-converted to provide I and Q baseband output signals to be transmitted to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1105 of synthesizer 1104 (FIG. 11). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1007 (FIG. 10) may comprise a balanced signal, although the scope of the embodiments is not limited in this respect. The I and Q baseband output signals may be provided to low-noise amplifier, such as amplifier circuitry 1106 (FIG. 11) or to filter circuitry 1108 (FIG. 11).

In some embodiments, the output baseband signals 1107 and the input baseband signals 1111 may be analog baseband signals, although the scope of the embodiments is not limited in this respect. In some alternate embodiments, the output baseband signals 1107 and the input baseband signals 1111 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1104 may be a fractional-N synthesizer or a fractional N/N+1 synthesizer, although the scope of the embodiments is not limited in this respect as other types of frequency synthesizers may be suitable. For example, synthesizer circuitry 1104 may be a delta-sigma synthesizer, a frequency multiplier, or a synthesizer comprising a phase-locked loop with a frequency divider. According to some embodiments, the synthesizer circuitry 1104 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1104 may be provided by a voltage controlled oscillator (VCO), although that is not a requirement. A divider control input may further be provided by either the baseband processing circuitry 908*a*-*b* (FIG. 9) depending on the desired output frequency 1105. In some embodiments, a divider control input (e.g., N) may be determined from a look-up table (e.g., within a Wi-Fi card) based on a channel number and a channel center frequency as determined or indicated by the example application processor 910. The application processor 910 may include, or otherwise be connected to, one of the example security signal converter 101 or the example received signal converter 103 (e.g., depending on which device the example radio architecture is implemented in).

In some embodiments, synthesizer circuitry 1104 may be configured to generate a carrier frequency as the output frequency 1105, while in other embodiments, the output frequency 1105 may be a fraction of the carrier frequency (e.g., one-half the carrier frequency, one-third the carrier frequency). In some embodiments, the output frequency 1105 may be a LO frequency (fLO).

Figure 12:
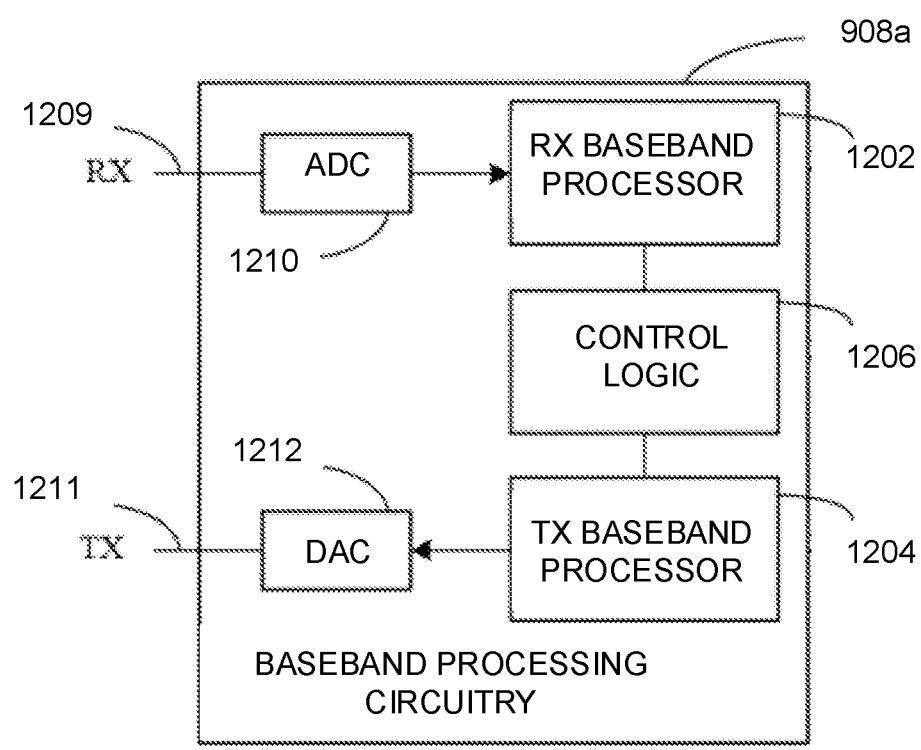
FIG. 12 illustrates a functional block diagram of baseband processing circuitry 908a in accordance with some embodiments.

FIG. 12 illustrates a functional block diagram of baseband processing circuitry 908*a* in accordance with some embodiments. The baseband processing circuitry 908*a* is one example of circuitry that may be suitable for use as the baseband processing circuitry 908*a* (FIG. 9), although other circuitry configurations may also be suitable. Alternatively, the example of FIG. 11 may be used to implement the example BT baseband processing circuitry 908*b* of FIG. 9.

The baseband processing circuitry 908*a* may include a receive baseband processor (RX BBP) 1202 for processing receive baseband signals 1109 provided by the radio IC circuitry 906*a-b* (FIG. 9) and a transmit baseband processor (TX BBP) 1204 for generating transmit baseband signals 1111 for the radio IC circuitry 906*a-b*. The baseband processing circuitry 908*a* may also include control logic 1206 for coordinating the operations of the baseband processing circuitry 908*a*.

In some embodiments (e.g., when analog baseband signals are exchanged between the baseband processing circuitry 908*a-b* and the radio IC circuitry 906*a-b*), the baseband processing circuitry 908*a* may include ADC 1210 to convert analog baseband signals 1209 received from the radio IC circuitry 906*a-b* to digital baseband signals for processing by the RX BBP 1202. In these embodiments, the baseband processing circuitry 908*a* may also include DAC 1212 to convert digital baseband signals from the TX BBP 1204 to analog baseband signals 1211.

In some embodiments that communicate OFDM signals or OFDMA signals, such as through baseband processor 908*a*, the transmit baseband processor 1204 may be configured to generate OFDM or OFDMA signals as appropriate for transmission by performing an inverse fast Fourier transform (IFFT). The receive baseband processor 1202 may be configured to process received OFDM signals or OFDMA signals by performing an FFT. In some embodiments, the receive baseband processor 1202 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 9, in some embodiments, the antennas 901 (FIG. 9) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 901 may each include a set of phased-array antennas, although embodiments are not so limited.

Although the radio architecture 900A, 900B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (AN) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following paragraphs describe examples of various embodiments.

Example 1 includes a method, comprising: generating a Physical Layer (PHY) Protocol Data Unit (PPDU) comprising both information for one or more first-generation stations (R1 STAs) and information for one or more second-generation stations (R2 STAs); and transmitting the PPDU to the one or more R1 STAs and the one or more R2 STAs, wherein a preamble portion of the PPDU comprises Resource Unit (RU) allocation entries corresponding to the one or more R1 STAs and RU allocation entries corresponding to the one or more R2 STAs.

Example 2 includes the method of Example 1, wherein the RU allocation entries corresponding to the one or more R1 STAs are selected from RU allocation entries for indicating RUs defined for R1 STAs, and the RU allocation entries corresponding to the one or more R2 STAs are selected from RU allocation entries for indicating RUs defined for R2 STAs.

Example 3 includes the method of Example 2, wherein the RU allocation entries for indicating the RUs defined for the R1 STAs are a part of RU allocation entries in a 802.11be RU allocation table, and the RU allocation entries for indicating the RUs defined for the R2 STAs are a different part of the RU allocation entries in the 802.11be RU allocation table.

Example 4 includes the method of Example 3, wherein eight RU allocation entries are allocated for indicating 1 to 8 users allocated to each RU defined for the R2 STAs, and the RU allocation entries for indicating the RUs defined for R2 STAs are used to indicate at least 27 RUs defined for the R2 STAs.

Example 5 includes the method of Example 3, wherein an index value of a RU allocation entry for indicating 1 to 8 users allocated to a RU defined for the R2 STAs is used to indicate the number of user fields, which are contributed to user specific fields in the same content channel as RU allocation subfields comprising the RU allocation entry in the preamble portion.

Example 6 includes the method of Example 5, wherein the number of user fields contributed to the user specific fields is derived based on the following expression: $N\_user=mod(n\_index, 8)+1$, wherein $N\_user$ denotes the number of user fields contributed to the user specific fields and $n\_index$ denotes the index value of the RU allocation entry.

Example 7 includes the method of Example 4, wherein a RU allocation entry for indicating a RU assigned to any of the one or more R2 STAs is selected from eight RU allocation entries for indicating the RU.

Example 8 includes the method of Example 7, wherein the RU allocation entry for indicating the RU assigned to the R2 STA is selected according to the number of STAs within the R2 STA.

Example 9 includes the method of Example 7, wherein the RU allocation entry for indicating the RU assigned to the R2 STA contributes a number of user fields to user specific fields in the same content channel as RU allocation subfields comprising the RU allocation entry in the preamble portion and the number of user fields is equal to the number of STAs within the R2 STA.

Example 10 includes the method of Example 2, wherein both the RUs defined for the R1 STAs and the RUs defined for the R2 STAS are multi-RUs (MRUs).

Example 11 includes the method of Example 10, wherein the structure of the MRUs defined for the R2 STAs is the same as that of the MRUs defined for the R1 STAs.

Example 12 includes the method of Example 3, wherein the RU allocation entries for indicating the RUs defined for the R2 STAs comprise R2RU_1User_Start, R2RU_0User_Start, and R2RU_0User_end, wherein the R2RU_1User_Start is used to indicate the start of a RU defined for the R2 STAs, the R2RU_0User_Start is used to indicate a RU allocation subfield comprising the R2RU_0User_Start is a continuation of the previous RU rather than a new RU, and the R2RU_0User_end is used to indicate the end of a RU corresponding to R2RU_1User_Start or R2RU_0User_Start, which is closest to the R2RU_0User_end.

Example 13 includes the method of Example 12, wherein the RU allocation entries for indicating the RUs defined for the R2 STAs further comprise R2RU_XUser_Start, X is an integer larger than 1 and less than or equal to 8, wherein the R2RU_XUser_Start is used to indicate the start of a RU defined for a R2 STA comprising X STAs.

Example 14 includes the method of Example 1, wherein the RU allocation entries corresponding to the one or more R1 STAs and the RU allocation entries corresponding to the one or more R2 STAs are comprised in RU allocation subfields of the preamble portion.

Example 15 includes the method of Example 1, wherein the PPDU is an extremely high throughput (EHT) PPDU.

Example 16 includes the method of Example 15, wherein the RU allocation entries corresponding to the one or more R1 STAs and the RU allocation entries corresponding to the one or more R2 STAs are contained in EHT-SIG of the preamble portion.

Example 17 includes the method of Example 1, wherein the method is applied in 802.11be Wireless Local Area Networks (WLANs).

Example 18 includes an apparatus, comprising processor circuitry configured to: generate a Physical Layer (PHY) Protocol Data Unit (PPDU) comprising both information for one or more first-generation stations (R1 STAs) and information for one or more second-generation stations (R2 STAs); and transmit the PPDU to the one or more R1 STAs and the one or more R2 STAs, wherein a preamble portion of the PPDU comprises Resource Unit (RU) allocation entries corresponding to the one or more R1 STAs and RU allocation entries corresponding to the one or more R2 STAs.

Example 19 includes the apparatus of Example 18, wherein the RU allocation entries corresponding to the one or more R1 STAs are selected from RU allocation entries for indicating RUs defined for R1 STAs, and the RU allocation entries corresponding to the one or more R2 STAs are selected from RU allocation entries for indicating RUs defined for R2 STAs.

Example 20 includes the apparatus of Example 19, wherein the RU allocation entries for indicating the RUs defined for the R1 STAs are a part of RU allocation entries in a 802.11be RU allocation table, and the RU allocation entries for indicating the RUs defined for the R2 STAs are a different part of the RU allocation entries in the 802.11be RU allocation table.

Example 21 includes the apparatus of Example 20, wherein eight RU allocation entries are allocated for indicating 1 to 8 users allocated to each RU defined for the R2 STAs, and the RU allocation entries for indicating the RUs defined for R2 STAs are used to indicate at least 27 RUs defined for the R2 STAs.

Example 22 includes the apparatus of Example 20, wherein an index value of a RU allocation entry for indicating 1 to 8 users allocated to a RU defined for the R2 STAs is used to indicate the number of user fields, which are contributed to user specific fields in the same content channel as RU allocation subfields comprising the RU allocation entry in the preamble portion.

Example 23 includes the apparatus of Example 22, wherein the number of user fields contributed to the user specific fields is derived based on the following expression: N_user=mod(n_index, 8)+1, wherein N_user denotes the number of user fields contributed to the user specific fields and n_index denotes the index value of the RU allocation entry.

Example 24 includes the apparatus of Example 21, wherein a RU allocation entry for indicating a RU assigned to any of the one or more R2 STAs is selected from eight RU allocation entries for indicating the RU.

Example 25 includes the apparatus of Example 24, wherein the RU allocation entry for indicating the RU assigned to the R2 STA is selected according to the number of STAs within the R2 STA.

Example 26 includes the apparatus of Example 24, wherein the RU allocation entry for indicating the RU assigned to the R2 STA contributes a number of user fields to user specific fields in the same content channel as RU allocation subfields comprising the RU allocation entry in the preamble portion and the number of user fields is equal to the number of STAs within the R2 STA.

Example 27 includes the apparatus of Example 19, wherein both the RUs defined for the R1 STAs and the RUs defined for the R2 STAS are multi-RUs (MRUs).

Example 28 includes the apparatus of Example 27, wherein the structure of the MRUs defined for the R2 STAs is the same as that of the MRUs defined for the R1 STAs.

Example 29 includes the apparatus of Example 20, wherein the RU allocation entries for indicating the RUs defined for the R2 STAs comprise R2RU_1User_Start, R2RU_0User_Start, and R2RU_0User_end, wherein the R2RU_1User_Start is used to indicate the start of a RU defined for the R2 STAs, the R2RU_0User_Start is used to indicate a RU allocation subfield comprising the R2RU_0User_Start is a continuation of the previous RU rather than a new RU, and the R2RU_0User_end is used to indicate the end of a RU corresponding to R2RU_1User_Start or R2RU_0User_Start, which is closest to the R2RU_0User_end.

Example 30 includes the apparatus of Example 29, wherein the RU allocation entries for indicating the RUs defined for the R2 STAs further comprise R2RU_XUser_Start, X is an integer larger than 1 and less than or equal to 8, wherein the R2RU_XUser_Start is used to indicate the start of a RU defined for a R2 STA comprising X STAs.

Example 31 includes the apparatus of Example 18, wherein the RU allocation entries corresponding to the one or more R1 STAs and the RU allocation entries corresponding to the one or more R2 STAs are comprised in RU allocation subfields of the preamble portion.

Example 32 includes the apparatus of Example 18, wherein the PPDU is an extremely high throughput (EHT) PPDU.

Example 33 includes the apparatus of Example 32, wherein the RU allocation entries corresponding to the one or more R1 STAs and the RU allocation entries corresponding to the one or more R2 STAs are contained in EHT-SIG of the preamble portion.

Example 34 includes the apparatus of Example 18, wherein the apparatus is applied in 802.11be Wireless Local Area Networks (WLANs).

Example 35 includes the apparatus of Example 18, further comprising: memory; and one or more antennas coupled to the processor circuitry.

Example 36 includes an apparatus, comprising: means for generating a Physical Layer (PHY) Protocol Data Unit (PPDU) comprising both information for one or more first-generation stations (R1 STAs) and information for one or more second-generation stations (R2 STAs); and transmitting the PPDU to the one or more R1 STAs and the one or more R2 STAs, wherein a preamble portion of the PPDU comprises Resource Unit (RU) allocation entries corresponding to the one or more R1 STAs and RU allocation entries corresponding to the one or more R2 STAs.

Example 37 includes the apparatus of Example 36, wherein the RU allocation entries corresponding to the one or more R1 STAs are selected from RU allocation entries for indicating RUs defined for R1 STAs, and the RU allocation entries corresponding to the one or more R2 STAs are selected from RU allocation entries for indicating RUs defined for R2 STAs.

Example 38 includes the apparatus of Example 37, wherein the RU allocation entries for indicating the RUs defined for the R1 STAs are a part of RU allocation entries in a 802.11be RU allocation table, and the RU allocation entries for indicating the RUs defined for the R2 STAs are a different part of the RU allocation entries in the 802.11be RU allocation table.

Example 39 includes the apparatus of Example 38, wherein eight RU allocation entries are allocated for indicating 1 to 8 users allocated to each RU defined for the R2 STAs, and the RU allocation entries for indicating the RUs defined for R2 STAs are used to indicate at least 27 RUs defined for the R2 STAs.

Example 40 includes the apparatus of Example 38, wherein an index value of a RU allocation entry for indicating 1 to Buses allocated to a RU defined for the R2 STAs is used to indicate the number of user fields, which are contributed to user specific fields in the same content channel as RU allocation subfields comprising the RU allocation entry in the preamble portion.

Example 41 includes the apparatus of Example 40, wherein the number of user fields contributed to the user specific fields is derived based on the following expression: N_user=mod(n_index, 8)+1, wherein N_user denotes the number of user fields contributed to the user specific fields and n_index denotes the index value of the RU allocation entry.

Example 42 includes the apparatus of Example 39, wherein a RU allocation entry for indicating a RU assigned to any of the one or more R2 STAs is selected from eight RU allocation entries for indicating the RU.

Example 43 includes the apparatus of Example 42, wherein the RU allocation entry for indicating the RU assigned to the R2 STA is selected according to the number of STAs within the R2 STA.

Example 44 includes the apparatus of Example 42, wherein the RU allocation entry for indicating the RU assigned to the R2 STA contributes a number of user fields to user specific fields in the same content channel as RU allocation subfields comprising the RU allocation entry in the preamble portion and the number of user fields is equal to the number of STAs within the R2 STA.

Example 45 includes the apparatus of Example 37, wherein both the RUs defined for the R1 STAs and the RUs defined for the R2 STAS are multi-RUs (MRUs).

Example 46 includes the apparatus of Example 45, wherein the structure of the MRUs defined for the R2 STAs is the same as that of the MRUs defined for the R1 STAs.

Example 47 includes the apparatus of Example 38, wherein the RU allocation entries for indicating the RUs defined for the R2 STAs comprise R2RU_1User_Start, R2RU_0User_Start, and R2RU_0User_end, wherein the R2RU_1User_Start is used to indicate the start of a RU defined for the R2 STAs, the R2RU_0User_Start is used to indicate a RU allocation subfield comprising the R2RU_0User_Start is a continuation of the previous RU rather than a new RU, and the R2RU_0User_end is used to indicate the end of a RU corresponding to R2RU_1User_Start or R2RU_0User_Start, which is closest to the R2RU_0User_end.

Example 48 includes the apparatus of Example 47, wherein the RU allocation entries for indicating the RUs defined for the R2 STAs further comprise R2RU_XUser_Start, X is an integer larger than 1 and less than or equal to 8, wherein the R2RU_XUser_Start is used to indicate the start of a RU defined for a R2 STA comprising X STAs.

Example 49 includes the apparatus of Example 36, wherein the RU allocation entries corresponding to the one or more R1 STAs and the RU allocation entries corresponding to the one or more R2 STAs are comprised in RU allocation subfields of the preamble portion.

Example 50 includes the apparatus of Example 36, wherein the PPDU is an extremely high throughput (EHT) PPDU.

Example 51 includes the apparatus of Example 50, wherein the RU allocation entries corresponding to the one or more R1 STAs and the RU allocation entries corresponding to the one or more R2 STAs are contained in EHT-SIG of the preamble portion.

Example 52 includes the apparatus of Example 36, wherein the apparatus is applied in 802.11be Wireless Local Area Networks (WLANs).

Example 53 includes a computer readable storage medium comprising instructions for causing one or more processors to execute the method of any of claims 1-16.

Although certain embodiments have been illustrated and described herein for purposes of description, a wide variety of alternate and/or equivalent embodiments or implementations calculated to achieve the same purposes may be substituted for the embodiments shown and described without departing from the scope of the disclosure. This application is intended to cover any adaptations or variations of the embodiments discussed herein. Therefore, it is manifestly intended that embodiments described herein be limited only by the appended claims and the equivalents thereof

What is claimed is:
1. An apparatus, comprising:
communications circuitry; and
processing circuitry coupled to the communications circuitry and configured to:
generate a Physical Layer (PHY) Protocol Data Unit (PPDU) comprising a preamble portion and a data portion, wherein the preamble portion comprises a Resource Unit (RU) allocation subfield including a plurality of RU allocation entries, and wherein for a subset of the RU allocation entries, a group of eight RU allocation entries is used to indicate a number of users allocated to each RU; and
transmit the PPDU to one or more stations (STAs) via the communications circuitry.
2. The apparatus of claim 1, wherein each of the RU allocation entries in the RU allocation subfield has 9 bits.
3. The apparatus of claim 1, wherein an index value of a RU allocation entry for indicating users allocated to an RU is used to indicate a number of user fields, which are contributed to user specific fields in the same content channel as RU allocation subfields comprising the RU allocation entry in the preamble portion.
4. The apparatus of claim 3, wherein the number of user fields contributed to the user specific fields is derived based on the following expression:

$$N\_user = mod(n\_index, 8) + 1$$

wherein N_user denotes the number of user fields contributed to the user specific fields and n_index denotes the index value of the RU allocation entry.
5. The apparatus of claim 1, wherein the RU allocation subfield further includes a second subset of RU allocation entries each having a value designated to disregard.
6. The apparatus of claim 5, wherein the processing circuitry is configured to: for each of the second subset of RU allocation entries, skip a number of user fields indicated by the value.

7. The apparatus of claim 1, wherein the apparatus comprises an IEEE 802.11 be compatible STA, and the PPDU is an Extremely high throughput (EHT) PPDU.

8. A method, comprising:
generating, by processing circuitry, a Physical Layer (PHY) Protocol Data Unit (PPDU) comprising a preamble portion and a data portion, wherein the preamble portion comprises a Resource Unit (RU) allocation subfield including a plurality of RU allocation entries, and wherein for a subset of the RU allocation entries, a group of eight RU allocation entries is used to indicate a number of users allocated to each RU; and
transmitting, by the processing circuitry, the PPDU to one or more stations (STAs) via communications circuitry coupled to the communications circuitry.

9. The method of claim 8, wherein each of the RU allocation entries in the RU allocation subfield has 9 bits.

10. The method of claim 8, wherein an index value of a RU allocation entry for indicating users allocated to an RU is used to indicate a number of user fields, which are contributed to user specific fields in the same content channel as RU allocation subfields comprising the RU allocation entry in the preamble portion.

11. The method of claim 10, wherein the number of user fields contributed to the user specific fields is derived based on the following expression:

$$N\_user = \mod(n\_index, 8) + 1$$

wherein N_user denotes the number of user fields contributed to the user specific fields and n_index denotes the index value of the RU allocation entry.

12. The method of claim 8, wherein the RU allocation subfield further includes a second subset of RU allocation entries each having a value designated to disregard.

13. The method of claim 12, further comprising: for each of the second subset of RU allocation entries, skipping a number of user fields indicated by the value.

14. The method of claim 8, wherein the PPDU is an Extremely high throughput (EHT) PPDU compatible with IEEE 802.11 be.

15. A non-transitory computer readable storage medium, comprising instructions for causing processing circuitry to execute a method comprising:
generating a Physical Layer (PHY) Protocol Data Unit (PPDU) comprising a preamble portion and a data portion, wherein the preamble portion comprises a Resource Unit (RU) allocation subfield including a plurality of RU allocation entries, and wherein for a subset of the RU allocation entries, a group of eight RU allocation entries is used to indicate a number of users allocated to each RU; and
transmitting the PPDU to one or more stations (STAs) via communications circuitry coupled to the communications circuitry.

16. The non-transitory computer readable storage medium of claim 15, wherein each of the RU allocation entries in the RU allocation subfield has 9 bits.

17. The non-transitory computer readable storage medium of claim 15, wherein an index value of a RU allocation entry for indicating users allocated to an RU is used to indicate a number of user fields, which are contributed to user specific fields in the same content channel as RU allocation subfields comprising the RU allocation entry in the preamble portion.

18. The non-transitory computer readable storage medium of claim 17, wherein the number of user fields contributed to the user specific fields is derived based on the following expression:

$$N\_user = \mod(n\_index, 8) + 1$$

wherein N_user denotes the number of user fields contributed to the user specific fields and n_index denotes the index value of the RU allocation entry.

19. The non-transitory computer readable storage medium of claim 15, wherein the RU allocation subfield further includes a second subset of RU allocation entries each having a value designated to disregard.

20. The non-transitory computer readable storage medium of claim 19, further comprising: for each of the second subset of RU allocation entries, skipping a number of user fields indicated by the value.

* * * * *